April 29, 1958     G. LAUER     2,832,459
HALVED FRUIT TURNOVER APPARATUS
Filed Jan. 23, 1956     2 Sheets-Sheet 1
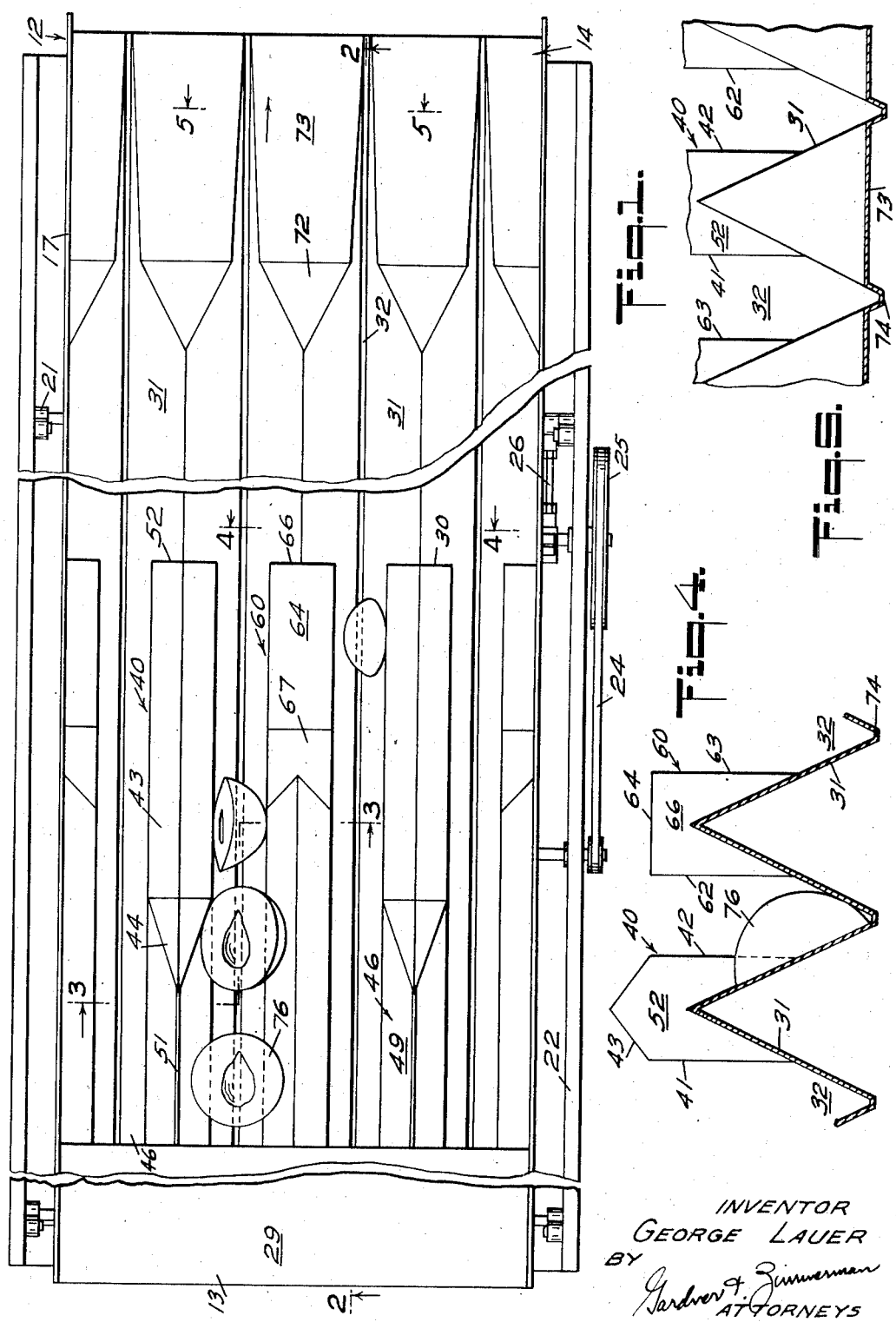
INVENTOR
GEORGE LAUER
BY
Gardner & Zimmerman
ATTORNEYS

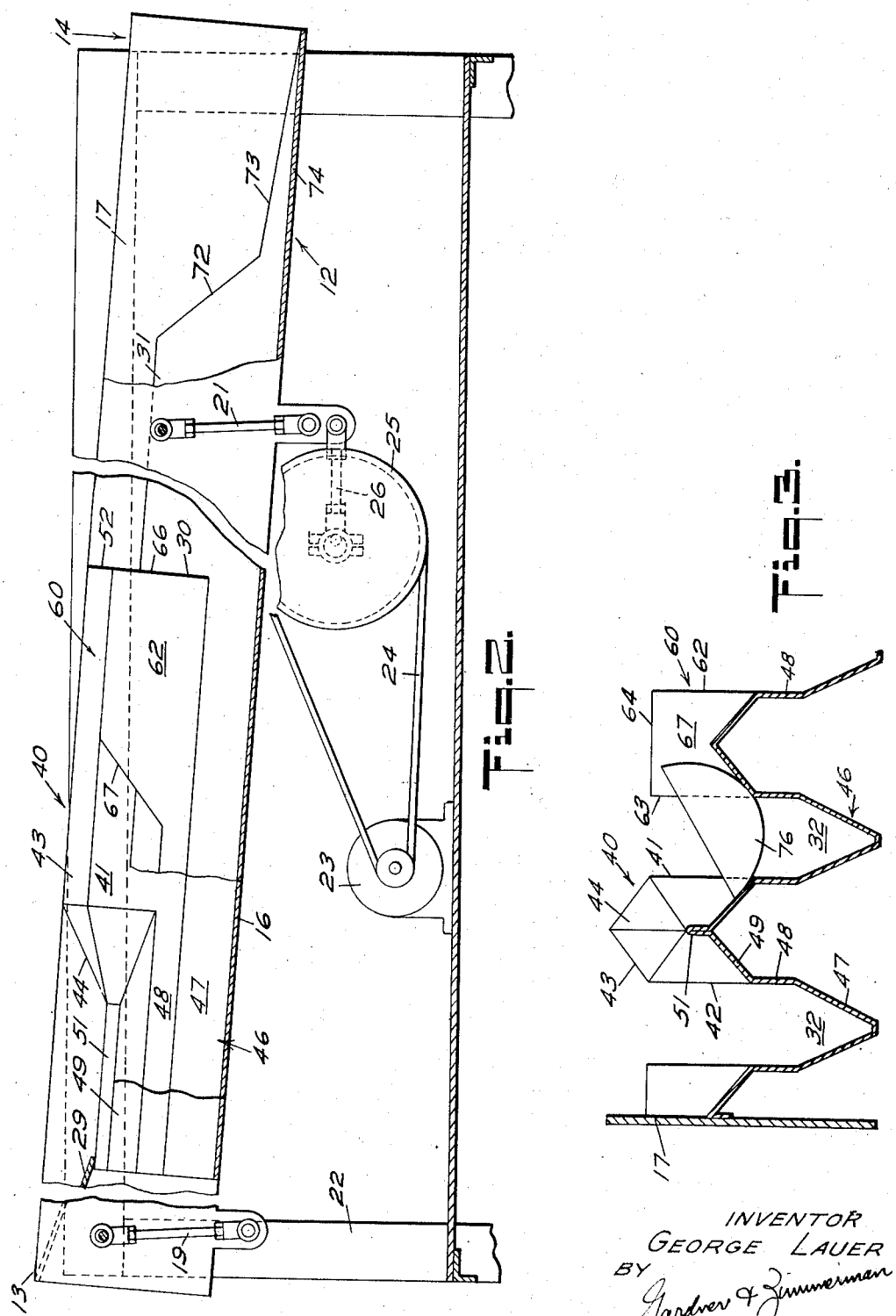

United States Patent Office 2,832,459
Patented Apr. 29, 1958

2,832,459

HALVED FRUIT TURNOVER APPARATUS

George Lauer, Oakland, Calif.

Application January 23, 1956, Serial No. 560,522

11 Claims. (Cl. 198—33)

This invention relates to apparatus for orienting cut halved fruit such as peaches, apricots and the like, and is more particularly directed towards apparatus designed for moving halved fruit into a cut face down position.

In many instances it is necessary to properly orient large quantities of halved fruit into a cut face down position such as for inspection, spraying, washing or any other desired purpose. In accordance with the prior art, mechanisms available for performing such functions have usually included a longitudinally extending table having a plurality of contiguous parallel longitudinally disposed V-shaped grooves or guides with the depth of the grooves at the receiving end preferably greater than at the discharge end wherein the grooves gradually flatten out and merge into a flat surface. This type of apparatus, while designed to have the fruit halves emerge with the cut face of the fruit downward at the discharge end have, in most instances, not been completely satisfactory due to the fact that many pieces of the halved fruit would pass between adjacent guides in a cut face up position and with the cut face being generally parallel to the table surface. The fruit would then remain in such position completely through to the discharge end of the apparatus without ever being caused to turn through an angle of 180 degrees to achieve its desired cut face down position.

It is therefore an object of the present invention to provide turnover apparatus for halved fruit in which the fruit halves are indiscriminately delivered to the apparatus and in which means are provided for insuring discharge of the fruit halves in a cut face down position.

Another object of the invention is to provide apparatus of the character described in which means are provided for moving the indiscriminately positioned fruit halves to assume an initial position with the cut surface thereof being substantially vertically disposed whereby other portions of the apparatus may then readily effect a movement of such surface towards a horizontal position.

A further object of the invention is to provide apparatus as hereinabove described in which there is no jamming of the fruit halves during their movement along the apparatus, and in which the fruit may be properly positioned without injury or damage to the relatively delicate fruit meat.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a top plan view of a halved fruit turnover apparatus constructed in accordance with the present invention.

Figure 2 is a vertical longitudinal cross-sectional view of the apparatus, taken substantially in the plane indicated by the line 2—2 of Figure 1.

Figure 3 is a vertical cross-sectional view taken substantially in the plane indicated by the line 3—3 of Figure 1.

Figure 4 is a vertical cross-sectional view taken substantially in the plane indicated by line 4—4 of Figure 1.

Figure 5 is a vertical cross-sectional view taken substantially in the plane indicated by line 5—5 of Figure 1.

The apparatus of the present invention broadly consists of a longitudinally extending table along which the fruit halves are advanced, in combination with means on the table for moving the indiscriminately placed fruit halves into position for movement into a cut face down position by the time the fruit reaches the discharge end of the table.

More specifically, and with reference to the accompanying drawings, the apparatus will be seen to include a table 12, having a bottom 16 and side walls 17, such table being inclined slightly downwardly from the receiving end 13 thereof to the discharge end 14. Inasmuch as the table is arranged to receive the fruit at the end 13 and discharge the same from the end 14, it is necessary to move such fruit longitudinally of the table, and for this purpose means are provided for longitudinally shaking or oscillating the table to afford the desired advance of the fruit halves. As here illustrated, the table is supported longitudinally on spaced and generally vertically disposed links 19 and 21, such links being pivotally carried on suitable frame work 22. A motor 23, through a belt 24, drives a sheave 25, and the latter is provided with a crank arm 26 eccentrically carried by the sheave shaft. The distal end of the crank arm is pivotally connected to the table, and in this manner, when the apparatus is in operating condition, the action of the crank arm, in combination with the pivotal supporting of the table on the links, results in the desired shaking or oscillating movement for causing fruit to move longitudinally along the table towards the discharge end 14 thereof.

The fruit is initially deposited from any suitable source onto a generally planar apron 29 at the receiving end of the table and means are provided for receiving the fruit from the apron so as to cause the same to progress in a single file or files along the length of the apparatus and during such longitudinal movement to be oriented into a cut face down position as it leaves the discharge end 14. Included in such means is a plurality of V-shaped ribs or guides 31 extending longitudinally of the table and in parallel spaced relationship to each other so as to define between adjacent guides a plurality of channels 32. As hereinabove explained, in most prior art turnovers, similar V-shaped ribs were utilized of constantly decreasing depth, but by referring to Figure 4 of the drawings, it will be appreciated that a fruit half could fall between a pair of adjacent guides with the cut face of the fruit in an uppermost and generally horizontal position, and the fruit could continue in such position for the entire length of the apparatus without ever achieving the desired cut face down position. Therefore, in accordance with the present invention additional means are provided, which, in combination with the ribs 31 will insure proper turning of the fruit into the cut face down relationship.

To accomplish the foregoing, a plurality of members are provided adjacent the receiving apron 29 which are adapted to engage any fruit halves which might normally lie across the troughs 32 in the manner aforesaid, and are positioned to cause such halves to slide into the grooves with the cut face of the fruit in a generally vertically disposed position. Then, after the fruit half passes such members and is contacted solely by the adjacent ribs, the fruit will readily assume the inclined position indicated in Figure 4, from which the cut surface thereof may subsequently be further lowered into its final cut face down position.

As here illustrated, and for reasons of simplifying the construction of the apparatus, the V-shaped guides 31 terminate in longitudinally spaced relation to the apron 29, and the members just mentioned are then interposed between the apron and guides 31 in longitudinal alignment with the latter, whereby the groove or trough 32 extends for substantially the entire length of the table. Extending towards apron 29 from the end 30 of alternate ribs 31 is a member 40 having a pair of vertically disposed and longitudinally extending parallel side walls 41 and 42 and an upper triangular portion 43, said walls extending vertically above the apex of its aligned rib 31, and the spacing between the walls being less than the spacing between adjacent troughs whereby the general plane of each wall substantially intersects the plane of the rib walls medially of the height of the latter, as seen in Figure 4 of the drawings. The end portions of the side walls of the member adjacent the apron 29 tapers or is laterally deflected along the longitudinal axis thereof to define a generally pointed nose section 44 with the apex thereof in alignment with the axis of the ribs 31. Member 40 is supported, as best illustrated in Figure 3, on a member 46, which, in cross-section, has laterally spaced V-shaped wall portions 47 in general alignment with the lower portions of ribs 31, whereby the troughs 32 may extend continuously. The wall portions 47 then extend vertically upwardly at 48 in coplanar relation with walls 41 and 42, and then define a triangular upper portion 49 in longitudinal alignment with the ribs 31. Preferably, a guide wall 51 is provided which extends from the end of the nose section to the apron and overlies the apex of the triangular support portion 49. The other end 52 of the member may be squared off in a plane normal to the longitudinal axis of the table.

As to the alternate ribs 31, which likewise terminate short of the apron, a member 60 is provided which extends from such ribs towards the apron to cooperate with the members 40 in the manner discussed. Each member 60 is supported on member 46 and has parallel side walls 62 and 63 in coplanar relationship with support walls 48, and a generally flat upper surface 64. One end 66 of the member is disposed in generally coplanar relationship with the flat ends 52 of the members 40, and the other end thereof is positioned in greater spaced relation from the apron 29 than is the tapered nose section 44 of guide 40. Also, it will be seen that this end has a flat downwardly tapered portion 67 which lies in a lateral plane angularly related to the general plane of the table.

With the foregoing construction in mind, an explanation will now be made as to the action of the guide members 40 and 60 on a fruit half deposited on the table in any position from the apron 29. Upon initial deposit onto or between adjacent triangular supporting portions 49 the fruit may assume a variety of different positions. If the fruit half falls into the groove 32 defined by supporting wall portions 47 and 48, there will be no difficulty in latter positioning the cut face of the fruit as shown in Figure 4. However, it is important to note than the maximum width of the grooves 32 at this location; i. e., the lateral spacing between adjacent wall portion 48, is less than the normal diameter of the individual fruit halves, so that many pieces of fruit, such as that indicated by the numeral 76 is Figure 1, will fall onto and be supported by adjacent support portions 49 and overlie the groove 32. Then, it is the function of the guide members 40 and 60 to turn the fruit half until the same slides into the groove between the guide members in a generally cut face vertical position. This is readily accomplished by virtue of the fruit being initially engaged by the tapered nose portion 44 of the guide 40, the wall 51 preventing the fruit half from riding along the apex of the support member 49. This nose portion will cause a movement of the fruit half laterally away from the member 40 and cause the same to climb up on the portion 49 of an adjacent rib as shown in Figure 4. If the fruit has not fallen into the groove by the time it reaches the guide 60, the inclined surface 67 of the latter will impart a further lifting and tilting of the fruit half and cause it to drop into the groove 32. Once the fruit half is within the groove 32, it will remain therein with the cut face generally vertically disposed between the relatively high adjacent side walls such as 41 and 63 or 42 and 62 of the adjacent guide members until it passes the ends 52 and 66 thereof, at which time the triangular shaped ribs 31 will engage the same. By referring to Figure 4 it has been found that the peach half confined in a triangular groove will naturally tend to assume the position illustrated by the fruit in the figure with the cut face thereof along one of the walls of the groove.

In conventional turnover mechanisms, the effective depth of the grooves is decreased adjacent the discharge end of the shaker table by tapering the ends of the ribs 31 laterally inwardly and downwardly in a curvate manner in an attempt to have the cut face of the fruit gradually lower from its Figure 4 position to a horizontal position. This concept is more effective in theory than in practice since the fruit half will in many instances, due to the reciprocation of the table, bounce away from the rounded discharge end of the ribs and land cut face up. In accordance with the present invention, means are provided adjacent the discharge end of the apparatus for insuring discharge of all of the fruit halves in a cut face down position.

As here shown, each of the ribs 31 terminates in a downwardly inclined end portion 72 lying in a common transverse plane angularly related to the general plane of the table. The upper surface 73 of the table has its general plane slightly above the bottom 74 of the respective grooves, and the surface 73 is inclined downwardly whereby the grooves extending beyond the rib portions 72 will decrease in depth until reaching the end of surface 73 where the grooves will merge with such surface. At the same time, the groove extensions likewise decrease in width and converge at the point of merger of the grooves with the surface. In this manner, when the fruit half reaches the end of the rib, as defined by end portion 72, the lower portion of the fruit will remain in the groove beyond the rib, but the center of gravity of the half will be above the groove height, resulting in the half falling cut face down onto surface 73.

What is claimed is:

1. Fruit half turnover apparatus including a plurality of longitudinally extending members defining generally V-shaped grooves therebetween, guide means on a portion of said members and extending upwardly therefrom and including opposed vertical parallel walls restricting the general width of said grooves, and an upper portion of said walls adjacent one end of alternate guide means tapering towards the longitudinal axis of one of said members.

2. Apparatus for orienting halved fruit into a cut face down position which comprises a longitudinally extending table adapted to receive halved fruit at one end thereof and discharge the fruit in a cut face down position at the other end thereof, means including opposed parallel wall members having a spacing less than the diameter of said fruit adjacent said receiving end adapted to tilt and retain the fruit halves with the cut faces thereof in a generally vertical plane and between said wall members, means adjacent said last named means adapted to support said cut faces along a surface inclined laterally upwardly, and means adjacent said last named means including a generally flat surface and shallow generally V-shaped groove therein extending longitudinally from said inclined surface for causing said fruit halves to fall cut face down onto said flat surface.

3. Turnover apparatus for fruit halves comprising a longitudinally extending table having a receiving end and a discharge end, a plurality of longitudinally extending members on said table defining parallel spaced grooves therebetween of generally V-shaped configuration, means on adjacent members defining a pair of laterally spaced and generally vertical opposed walls extending upwardly from medially of the height of said grooves, and one of said walls tapering away from its adjacent groove and opposed wall towards the longitudinal axis of its member and extending towards said table receiving end axially beyond its opposed wall.

4. Apparatus of the character described comprising a longitudinally extending table, means defining a longitudinally extending groove on said table, said groove for a first portion of the length thereof having generally parallel side walls and for a second portion of the length thereof having a generally V-shaped cross-sectional form, the height of said groove at said first portion being greater than at said second portion, and the maximum width of said groove at said second portion being greater than the width at said first portion.

5. Halved fruit turnover apparatus comprising a longitudinally extending member having a fruit receiving end and fruit discharge end, said member having a groove provided longitudinally thereof, said groove having upwardly and outwardly extending wall members for a portion of its length so as to provide a generally V-shaped cross-sectional form, said groove adjacent said receiving end having opposed generally vertical wall members restricting the maximum width of said groove to less than the maximum width at said V-shaped portion.

6. Apparatus as set forth in claim 5 in which said member adjacent said discharge end is formed so as to reduce the height and width of said groove.

7. Apparatus for orienting halved fruit comprising a longitudinally extending table, means for longitudinally reciprocating said table for advancing fruit from a receiving end thereof to a discharge end, means adjacent said receiving end defining a longitudinally extending groove having upwardly and outwardly diverging side wall portions, means adjacent said last named means and extending towards said discharge end defining a groove having generally vertical side wall portions and of a lesser width than the maximum width of said diverging wall portions, and means adjacent said last named means defining a groove of generally V-shaped cross-sectional form, each of said grooves being in longitudinal alignment with the other grooves and in communication with its adjacent groove and with said last named V-shaped groove having the opposed walls thereof having a greater inclination to a horizontal plane than said diverging wall portions.

8. Apparatus as set forth in claim 7 in which the height of said groove having the vertical side wall portions is greater than the height of said other grooves while the width thereof is less than the maximum width of said other grooves.

9. Apparatus for orienting halved fruit into a cut face down position which comprises a longitudinally extending table adapted to receive halved fruit at one end thereof and discharge the fruit in a cut face down position at the other end thereof, means for advancing said fruit from said receiving end to said discharge end, means on said table defining a longitudinally extending groove, said last named means including opposed upper wall portions inclined upwardly and laterally outwardly from the sides of said groove, a generally vertically disposed wall on one of said portions extending from adjacent the outermost edge thereof angularly towards the side of said groove whereby halved fruit moving along said opposed wall portions will engage said wall and be moved towards the other wall portion, said other wall portion having an upwardly inclined surface longitudinally spaced from said wall, said groove having generally vertical sides, and a V-shaped wall member forming a continuation of said groove having a maximum width greater than the spacing between said groove sides.

10. Apparatus as set forth in claim 3 in which said opposed wall tapers downwardly towards said receiving end in a plane disposed transversely to the longitudinal axis of said table whereby the vertical height thereof is reduced.

11. Apparatus as set forth in claim 1 in which said members adjacent one end thereof decrease in height and taper towards their adjacent members thereby reducing the depth and width of the grooves defined therebetween.

References Cited in the file of this patent

UNITED STATES PATENTS

| | | |
|---|---|---|
| 2,337,394 | Kok | Dec. 21, 1943 |
| 2,610,724 | Dudley | Sept. 16, 1952 |